US008636047B2

(12) United States Patent
Eitel et al.

(10) Patent No.: US 8,636,047 B2
(45) Date of Patent: Jan. 28, 2014

(54) METHOD AND INSTALLATION FOR APPLYING FOIL MATERIAL ONTO SUCCESSIVE SHEETS

(75) Inventors: Johann Emil Eitel, Thüngen (DE); Matthias Gygi, Schmitten (CH); Kurt Georg Nagler, Würzburg (DE)

(73) Assignee: KBA-Notasys SA, Lausanne (CH)

( * ) Notice: Subject to any disclaimer, the term of this patent is extended or adjusted under 35 U.S.C. 154(b) by 265 days.

(21) Appl. No.: 12/922,039

(22) PCT Filed: Mar. 6, 2009

(86) PCT No.: PCT/IB2009/050939
§ 371 (c)(1),
(2), (4) Date: Oct. 7, 2010

(87) PCT Pub. No.: WO2009/112989
PCT Pub. Date: Sep. 17, 2009

(65) Prior Publication Data
US 2011/0017393 A1 Jan. 27, 2011

(30) Foreign Application Priority Data
Mar. 14, 2008 (EP) .................................... 08152798

(51) Int. Cl.
*B29C 65/00* (2006.01)
*B32B 37/00* (2006.01)
*B32B 38/04* (2006.01)
*B32B 38/10* (2006.01)

(52) U.S. Cl.
USPC ......................... 156/522; 156/379.6; 156/552

(58) Field of Classification Search
USPC ................. 156/291, 263, 257, 268, 264, 270, 156/353.253, 265.64, 378, 302, 522, 552, 156/379.6
See application file for complete search history.

(56) References Cited

U.S. PATENT DOCUMENTS 4,702,789 A 10/1987 Ceraso
5,776,284 A * 7/1998 Sykes et al. .................. 156/252
(Continued)

FOREIGN PATENT DOCUMENTS

DE 120156 6/1976
DE 10 2005 043 676 3/2007
(Continued)

*Primary Examiner* — Linda Gray
(74) *Attorney, Agent, or Firm* — Seager, Tufte & Wickhem LLC

(57) ABSTRACT

There is described a method for applying foil material (200) onto successive sheets (S), especially sheets of securities. In a first step, individual sheets (S) are transported in succession along a sheet transport path. In a second step, at least one continuous band of foil material (200) is applied onto the individual sheets (S) along a direction substantially parallel to a direction of displacement of the individual sheets, thereby forming a continuous flow of sheets linked to one another by the said at least one continuous band of foil material (200). In a third step, the said at least one continuous band of foil material (200) is cut by means of a laser beam such that the continuous flow of sheets is again separated into individual sheets (S) with portions of foil material (200*) remaining on the sheet. The cutting is performed at positions located on the sheets (S) such that said portions of foil material (200*) remaining on the sheets do not extend beyond leading and trailing edges of the sheets (S). Waste portions (205) of said at least one continuous band of foil material (200) that are not to remain on the sheets (S) are evacuated by aspiration, evacuation being carried out by direct aspiration of the waste portions (205) at least at a first position located downstream of and proximate to a cutting position where said at least one continuous band of foil material (200) is cut by the laser beam. There is also described an installation for carrying out the above method.

7 Claims, 9 Drawing Sheets

(56) References Cited

U.S. PATENT DOCUMENTS

| | | | | |
|---|---|---|---|---|
| 5,797,320 | A | 8/1998 | Buschulte et al. | |
| 5,937,759 | A | 8/1999 | Mitsam et al. | |
| 6,062,134 | A | 5/2000 | Eitel et al. | |
| 6,112,651 | A | 9/2000 | Eitel et al. | |
| 6,142,069 | A | 11/2000 | Eitel et al. | |
| 6,182,959 | B1 | 2/2001 | Eitel et al. | |
| 6,202,549 | B1 | 3/2001 | Mitsam et al. | |
| 6,263,790 | B1 | 7/2001 | Wyssmann et al. | |
| 6,428,051 | B1 | 8/2002 | Herrmann et al. | |
| 6,508,489 | B2 | 1/2003 | Herrmann et al. | |
| 7,384,495 | B2 | 6/2008 | Schaede | |
| 7,922,858 | B2 * | 4/2011 | Eitel et al. | 156/268 |
| 2002/0030360 | A1 | 3/2002 | Hermann et al. | |
| 2005/0166771 | A1 | 8/2005 | Gygi et al. | |
| 2005/0241445 | A1 | 11/2005 | Schaede | |
| 2006/0185790 | A1 * | 8/2006 | Eckstein et al. | 156/267 |
| 2006/0231537 | A1 | 10/2006 | Schaede | |
| 2006/0283542 | A1 | 12/2006 | Schaede | |
| 2007/0029784 | A1 | 2/2007 | Moreau | |
| 2008/0271854 | A1 | 11/2008 | Eitel et al. | |
| 2009/0173430 | A1 | 7/2009 | Schaede | |
| 2010/0024511 | A1 | 2/2010 | Eitel et al. | |

FOREIGN PATENT DOCUMENTS

| | | |
|---|---|---|
| EP | 0 965 446 | 12/1999 |
| EP | 1 961 578 | 8/2008 |
| WO | 94/13487 | 6/1994 |
| WO | 95/10420 | 4/1995 |
| WO | 97/01442 | 1/1997 |
| WO | 97/35721 | 10/1997 |
| WO | 97/35794 | 10/1997 |
| WO | 97/35795 | 10/1997 |
| WO | 97/36756 | 10/1997 |
| WO | 03/043823 | 5/2003 |
| WO | 03/092971 | 11/2003 |
| WO | 2004/024464 | 3/2004 |
| WO | 2004/096482 | 11/2004 |
| WO | 2004/096541 | 11/2004 |
| WO | 2005/068211 | 7/2005 |
| WO | 2005/102733 | 11/2005 |
| WO | 2008/104904 | 9/2008 |

* cited by examiner

METHOD AND INSTALLATION FOR APPLYING FOIL MATERIAL ONTO SUCCESSIVE SHEETS

TECHNICAL FIELD

The present invention generally relates to a method and installation for applying foil material onto successive sheets, especially sheets of securities. The present invention is especially applicable in the context of the production of security documents, such as banknotes.

BACKGROUND OF THE INVENTION

The application of foil material onto sheets, especially sheets of securities, is as such already well-known in the art. Such application is typically aimed at providing securities with additional security elements, such as in particular so-called OVD's (Optically Variable Devices). OVD's typically take the form of a patch or foil laminate comprising an optically-diffractive layer (usually a metallized layer) producing optically variable effects. OVD's are in particular known under the name of KINEGRAM®, which is a registered trademark of OVD Kinegram AG, a member of the Leonhard Kurz Group.

OVD's are typically supplied in the form of a continuous film or band of carrier material carrying transfer elements that are to ultimately form the actual OVD's. These are usually applied using so-called hot-foil stamping techniques, which make use of combined pressure and temperature to activate an adhesive layer provided on the transfer elements and cause transfer thereof from the carrier material onto the sheets or web being processed.

Method and installations for carrying out hot-foil stamping techniques are disclosed for instance in International applications nos. WO 94/13487 A1, WO 97/01442 A1, WO 97/35721 A1, WO 97/35794 A1, WO 97/35795 A1, WO 97/36756 A1, WO 03/043823 A1, WO 2005/102733 A2, and European patent application EP 0 965 446 A1.

Besides the application of OVD's on securities, it has also been proposed to cut windows in the securities and cover these windows with a film of foil material, usually transparent. Such a solution is for instance proposed in International application no. WO 95/10420 A1. In contrast to OVD's, the layer of foil material that is applied to cover windows is comparatively thicker and more resistant as it has to withstand greater mechanical constraints and be self-supporting in the region of the window.

Similarly, it has also been proposed to reinforce regions of reduced thickness created in securities by the provision of a film of foil material onto said regions. A method for reinforcing security documents provided with at least one zone of reduced thickness is for instance disclosed in International application no. WO 2004/024464 A1.

Provision of windows in securities can be carried out in different ways. A method and installation for cutting windows in sheets using mechanical cutting tools is for instance disclosed in International application no. WO 03/092971 A1. A method and installation for cutting windows in sheets using a laser-cutting tool is for instance disclosed in International application no. WO 2004/096482 A1.

Covering of the windows by foil material is discussed in greater detail in International applications nos. WO 2004/096541 A1 and WO 2005/068211 A1.

According to International application no. WO 2004/096541 A1, foil material is applied in the form of successive strips of foil material that are cut upstream of an application unit. The application unit is basically similar to those used for carrying out hot-foil stamping with the main difference that the strips of foil material are completely transferred onto the sheets. In this context, it is more appropriate to say that the application unit performs lamination of the foil material onto the sheets, rather than stamping, which process involves transfer of an element from a carrier band onto the sheets and recuperation of the used carrier band.

The solution of International application no. WO 2004/096541 A1 has been found to be rather difficult to implement as it requires precise cutting and positioning of the cut strips of laminate with respect to the sheets. This prior art solution in particular requires a specifically-designed aspiration system to properly seize and transport the strips of laminate such that these are brought in contact with the sheets at the desired locations.

The solution of International application no. WO 2004/096541 A1 is furthermore only applicable for strips of laminate having a minimum length and is in particular not suited for applying small-sized patches of foil material onto the sheets.

There is therefore a need for an improved method and installation for applying foil material onto successive sheets. Such an improved method and installation forms the subject-matter of European patent application No. 07103051.4 entitled "METHOD AND INSTALLATION FOR APPLYING FOIL MATERIAL ONTO SUCCESSIVE SHEETS" filed on Feb. 27, 2007 in the name of the present Applicant (published as EP 1 961 578 A1), as well as the subject-matter of International application No. PCT/IB2008/050626 of Feb. 21, 2008 (published as WO 2008/104904 A1) which claims priority of EP 07103051.4, the contents of both applications being incorporated herein by reference in their entirety.

This improved method comprises the following steps. In a first step, individual sheets are transported in succession along a sheet transport path. In a second step, at least one continuous band of foil material is applied onto the individual sheets along a direction substantially parallel to a direction of displacement of the individual sheets, thereby forming a continuous flow of sheets linked to one another by the said at least one continuous band of foil material. In a third step, the said at least one continuous band of foil material is cut such that the continuous flow of sheets is again separated into individual sheets with portions of foil material remaining on the sheet. Cutting of the said at least one continuous band of foil material is performed at positions located on the sheets such that the portions of foil material remaining on the sheets do not extend beyond leading and trailing edges of the sheets.

An installation for carrying out the above method comprises (i) a sheet-by-sheet feeding station for feeding the individual sheets, (ii) a foil application unit for applying the said at least one continuous band of foil material onto the individual sheets, (iii) a cutting unit, located downstream of the foil application unit, for cutting the said at least one continuous band of foil material, and (iv) a sheet delivery station for receiving the individual sheets.

Thanks to the above method and installation, a precise application of the foil material onto the successive sheets is ensured, while guaranteeing that the applied foil material does not cause perturbations during further processing of the sheets in the downstream processes. Indeed, as cutting of the foil material is performed at positions located on the sheets such that the portions of foil material remaining on the sheets do not extend beyond the leading and trailing edges of the sheets, proper alignment of the sheets in the downstream processes (which alignment uses as reference the leading edge of the sheets, or as the case may be the trailing edge) is not affected.

According to one embodiment of the above method and installation, cutting can for instance be performed by mechanical cutting tools without causing damage to the sheets. According to an alternate embodiment, and provided the foil material is made of plastic or any other material that can be melted, cutting can be carried by melting the foil material using a heating element (such as a heated electrical wire). Still according to an alternate embodiment, cutting of the foil material can be carried out using a laser beam. Tests carried out by the Applicant have demonstrated that laser cutting is in particular very efficient at selectively cutting the foil material without damaging the sheets.

A major advantage of laser cutting resides in that the cutting operation can be performed in a "touchless" manner, i.e. the laser cutting unit as such is not brought into contact with the foil material, but rather merely the laser beam produced by the laser cutting unit.

A difficulty however arises in connection with the evacuation of the waste portions of the continuous band or bands of foil material that are not to remain on the sheets. Such evacuation is preferably performed by aspiration as suggested in European patent application No. 07103051.4 and International application No. PCT/IB2008/050626. Such difficulty is exacerbated in the case of cutting of the foil material by means of a laser since specific means need to be provided to carry out such evacuation without interfering with the laser.

SUMMARY OF THE INVENTION

A general aim of the invention is thus to further improve the known methods and installations for applying foil material onto successive sheets.

An aim of the invention is in particular to provide a solution that is less complicated to implement than the known solutions.

A further aim of the present invention is to provide a solution that allows application of foil material in a precise manner onto the sheets.

Still another aim of the present invention is to provide a solution that allows application of foil material onto the sheets without this affecting further processing of the said sheets in the downstream processes.

Yet another aim of the present invention is to provide a solution that is capable of applying a wide range of sizes of portions of foil material onto the sheets.

More precisely, a particular aim of the present invention is to propose a solution of the type proposed in European patent application No. 07103051.4 and International application No. PCT/IB2008/050626 wherein the cutting operation is performed by means of a laser beam and wherein waste portions of the continuous band or bands of foil material that are not to remain on the sheets are properly evacuated.

These aims are achieved thanks to the solution defined in the claims.

The method according to the invention comprises the following steps. In a first step, individual sheets are transported in succession along a sheet transport path. In a second step, at least one continuous band of foil material is applied onto the individual sheets along a direction substantially parallel to a direction of displacement of the individual sheets, thereby forming a continuous flow of sheets linked to one another by the said at least one continuous band of foil material. In a third step, the said at least one continuous band of foil material is cut by means of a laser beam such that the continuous flow of sheets is again separated into individual sheets with portions of foil material remaining on the sheet. Cutting of the said at least one continuous band of foil material is performed at positions located on the sheets such that the portions of foil material remaining on the sheets do not extend beyond leading and trailing edges of the sheets. Further, waste portions of said at least one continuous band of foil material that are not to remain on the sheets are evacuated by aspiration, said evacuation being carried out by direct aspiration of the waste portions at least at a first position located downstream of and proximate to the cutting position where said at least one continuous band of foil material is cut by the laser beam.

Thanks to the above method, a precise application of the foil material onto the successive sheets is ensured, while guaranteeing that the applied foil material does not cause perturbations during further processing of the sheets in the downstream processes. Indeed, as cutting of the foil material is performed at positions located on the sheets such that the portions of foil material remaining on the sheets do not extend beyond the leading and trailing edges of the sheets, proper alignment of the sheets in the downstream processes (which alignment uses as reference the leading edge of the sheets, or as the case may be the trailing edge) is not affected.

A priori, cutting of the foil material at positions located on the sheets would appear to be detrimental to the integrity of the sheets. Tests have however shown that cutting of the foil material can be carried out on the surface of the sheets using a laser beam without any major problem. Tests carried out by the Applicant have indeed demonstrated that laser cutting is very efficient at selectively cutting the foil material without damaging the sheets.

Advantageous embodiments of the invention form the subject-matter of the dependent claims and are discussed below.

According to an advantageous embodiment, cutting of the said at least one continuous band of foil material is performed immediately after a leading edge of the sheets and immediately before a trailing edge of the sheets over a whole width of the continuous band of foil material, such that a continuous portion of foil material is left remaining on each sheet. In such case, it is in particular preferable to carry out cutting in unprinted margins of the sheets.

According to an alternate embodiment, cutting of the said at least one continuous band of foil material is performed at a plurality of locations along a length of the continuous band of foil material, such that a plurality of distinct portions of foil material are left remaining on each sheet.

In the context of the invention, the continuous band or bands of foil material can advantageously be supplied in the form of a roll of foil material.

In the context of the production of documents, such as security documents, wherein the sheets each carry an array of imprints arranged in a matrix of rows and columns, at least one continuous band of foil material is applied along each column of imprints.

The present invention is in particular applicable to cover windows or openings cut into the sheets prior to the application of the continuous band or bands of foil material. In this case in particular, it is advantageous to apply a foil material that is substantially transparent.

The foil material is preferably a plastic laminate comprising an adhesive layer which is brought into contact with the surface of the sheets. This adhesive layer is advantageously a pressure-activated and/or thermo-activated adhesive layer which is activated during application only at locations corresponding to the portions of foil material that are to remain on the sheets. Cutting is preferably carried out in this case at locations where the adhesive layer has not been activated, advantageously in an immediate vicinity of the portions of foil material that are to remain on the sheets. In this case, while peripheral portions of the foil material are not adhering to the sheets after the application process, the dimensions thereof can be minimized. Furthermore, it is common practice to subject the sheets after application of foil material to an intaglio printing process, especially in order to overprint the foil material. As a result of intaglio printing, the peripheral portions of the foil material are made to adhere to the sheets due to the combined effect of temperature and pressure inherent to intaglio printing.

An installation for carrying out the above method forms the subject-matter of dependent claims, which installation generally comprises (i) a sheet-by-sheet feeding station for feeding the individual sheets, (ii) a foil application unit for applying the said at least one continuous band of foil material onto the individual sheets, (iii) a laser cutting unit, located downstream of the foil application unit, for cutting the said at least one continuous band of foil material, and (iv) a sheet delivery station for receiving the individual sheets. Said installation further comprises at least a first suction unit including a suction head disposed adjacent to the sheets for carrying out aspiration of waste portions of said at least one continuous band of foil material at said first position located downstream of and proximate to the cutting position where said at least one continuous band of foil material is cut by the laser beam.

The suction head advantageously comprises a suction aperture for aspirating the waste portions of the said at least one continuous band of foil material and at least one non-aspirating supporting portion bearing against the sheets at a location not covered by said at least one continuous band of foil material. Such suction head configuration enables to ensure proper aspiration of the portions of foil material to be evacuated, while preventing that the sheets get drawn into the suction head. In a preferred embodiment, the position of each suction head is adjustable along and/or transversely to the direction of displacement of said sheets.

According to another preferred embodiment of the installation, a second aspiration unit is provided and disposed at a second position located downstream of the first position to evacuate waste portions of said at least one continuous band of foil material that might not have been evacuated by the first aspiration unit. In such case, the first and second aspiration units can conveniently be operatively-coupled to one another, i.e. by using a common suction source.

A device for checking that the waste portions of foil material have properly been evacuated is preferably further provided.

According to still another preferred embodiment of the installation, means are further provided for checking passage of a leading and/or trailing edge of the sheets and adjusting operation of the laser cutting unit as a function of the passage of the leading and/or trailing edge of the sheets. This ensures a stable operation and precise cutting of the foil material at determined locations on each sheet.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

Figure 1:
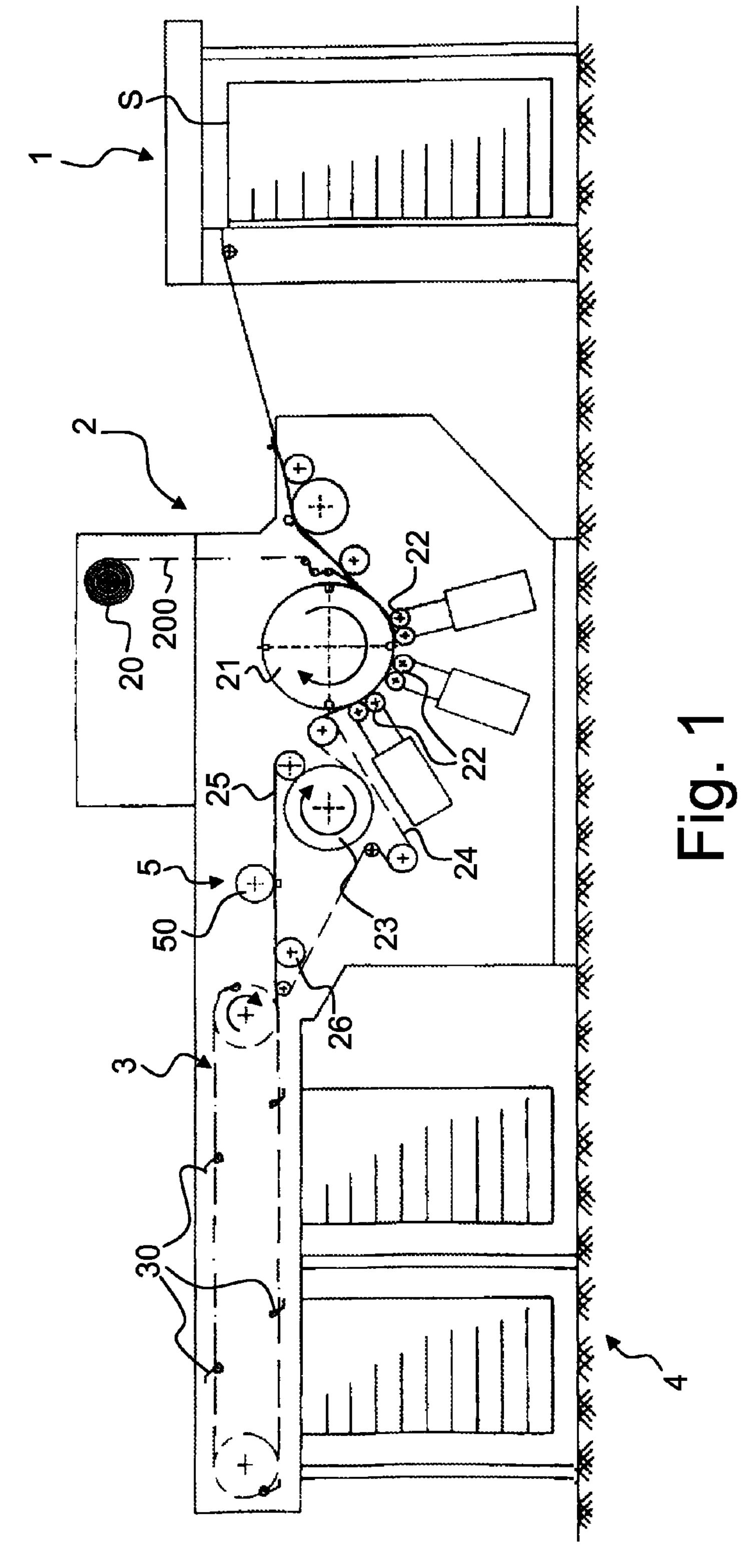
FIG. 1 is a schematic side view of a sheet-fed processing machine for applying foil material onto successive sheets as discussed in European patent application No. 07103051.4 and International application No. PCT/IB2008/050626.

FIG. 1 is a schematic side view of a sheet-fed processing machine for applying foil material onto successive sheets as discussed in European patent application No. 07103051.4 and International application No. PCT/IB2008/050626 discussed hereabove. The configuration thereof is almost identical to the hot-foil stamping machines of the prior art, as for instance disclosed in International applications nos. WO 97/35721 A1, WO 97/35794 A1, WO 97/35795 A1 and WO 97/36756 A1, the disclosures of which are incorporated herein by reference. It comprises a sheet-by-sheet feeding station 1 for feeding individual sheets S to a foil application unit 2, which foil application unit 2 basically comprises an application cylinder 21 (in this case a four-segment cylinder having four segments each capable of seizing and transporting a sheet coming from the sheet-by-sheet feeding station 1) that cooperates with a plurality of rows of pressure rollers 22 which are pressed resiliently against the circumference of the application cylinder 21 by means of pneumatic cylinders (not referenced). In this case, three pairs of rows of pressure rollers 22 are pressed against the circumference of the application cylinder 21.

Foil material is conveniently supplied from a supply roll 20 in the form of a continuous band of foil material 200. This continuous band 200 is fed to the application cylinder 21 so as to be sandwiched between the circumference of the application cylinder 21 and the sheets S. In the context of the production of security documents, such as banknotes, each sheet S is typically provided with an array of imprints P arranged in a matrix of rows and columns (as is for instance illustrated in FIGS. 2 and 3). One will thus understand that at least one supply roll 20 will be provided so as to supply a corresponding band of foil material 200 along each column of imprints P.

The foil material 200 is preferably made of a plastic laminate, preferably substantially transparent, such as, but not limited to, a polyester (PET) or polycarbonate (PC) material, comprising an adhesive layer which is brought into contact with the surface of the sheets. This foil material 200 can optionally be provided with a partially demetallized layer as for instance sold under the name of KINEGRAM Zero.Zero®, which is a registered trademark of OVD Kinegram AG.

The adhesive layer is preferably a pressure-activated and/or temperature-activated adhesive layer which is activated during application only at locations corresponding to the portions of foil material that are to remain on the sheets. Alternatively, a two-compound adhesive could be used wherein one adhesive compound is applied on the foil material and the other adhesive compound is applied onto the sheets prior to foil application (such as discussed for instance in International application no. WO 2005/068211 A1).

The application cylinder 21 is provided with a plurality of heated stamping members (not shown) at the locations where the foil material 200 is to be applied onto the sheets S. International application no. WO 2005/102733 A2, the disclosure of which is incorporated herein by reference, provides a detailed description of an application cylinder 21 equipped with such stamping members. It suffice to understand that the stamping members are dimensioned according to the portions of adhesive layer to be activated on the foil material 200 and that the pressure rollers 22 are designed for rolling contact with the said stamping members.

For instance, in the context of the embodiment illustrated by FIGS. 2 and 3, which embodiment will be discussed below, it is envisaged to apply each continuous band of foil material 200 so that a continuous portion thereof, designated by reference numeral 200*, is left remaining on each sheet S. In other words, each stamping member on the application cylinder 21 is dimensioned such as to exhibit the shape of a strip the length of which corresponds to the length of adhesive layer to be activated on the band of foil material 200.

Figure 2:
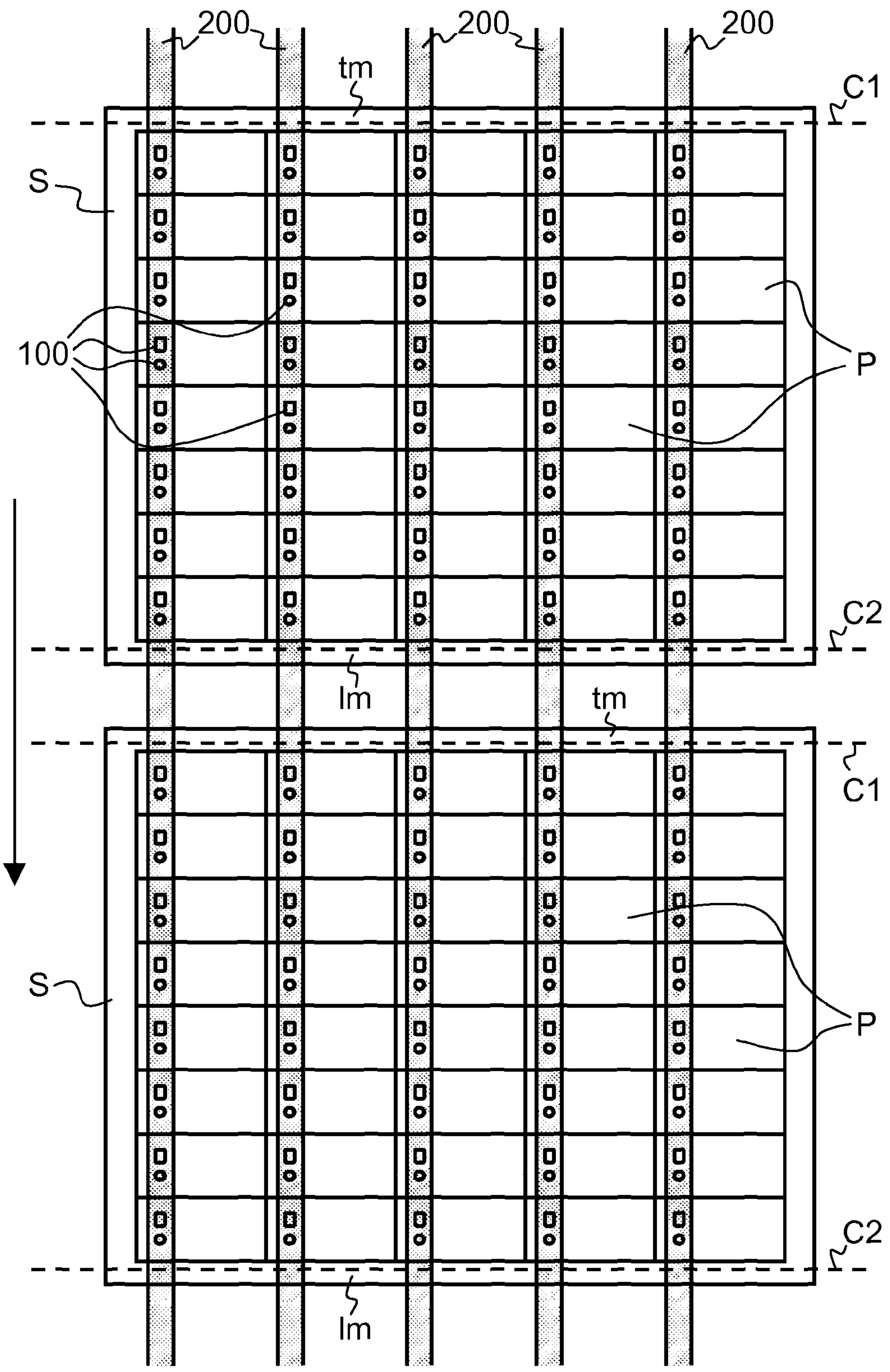
FIG. 2 is a schematic top view of two successive sheets linked to one another by a plurality of continuous bands of foil material which are applied onto the sheets along a direction parallel to a direction of displacement of the sheets.

Following application of the continuous bands of foil material 200 onto the individual sheets S, a continuous flow of sheets S linked to one another by the continuous bands of foil material 200 is formed, as schematically illustrated in FIG. 2.

Referring again to FIG. 1, the continuous flow of sheets S linked by the continuous bands of foil material 200 is fed to a cooling unit comprising a cooling roller 23 cooperating with conveyor belts 24. In the illustrated embodiment, the conveyor belts 24 are driven into rotation so as to turn in a counter-clockwise direction in FIG. 1 and draw the continuous flow of sheets S away from the surface of the application cylinder 21, against the circumference of the cooling roller 23 (which roller 23 rotates in the clockwise direction in FIG. 1), and onto a horizontal guide plate 25.

The cooling unit is not as such required and may be omitted. Tests have however shown that the cooling unit may be advantageous in that it enables stabilization and regulation of the temperature of the processed sheets S as well as of the downstream portion of the foil application unit 2 where the cutting unit, designated by reference numeral 5, is located.

The cutting unit 5 is located downstream of the foil application unit 2, in the vicinity of the horizontal guide plate 25, for cutting the continuous bands of foil material 200. In the illustration of FIG. 1, the cutting unit 5 is a mechanical cutting unit comprising a cutting cylinder 50 as described in greater detail in European patent application No. 07103051.4 and International application No. PCT/IB2008/050626.

Figure 3:
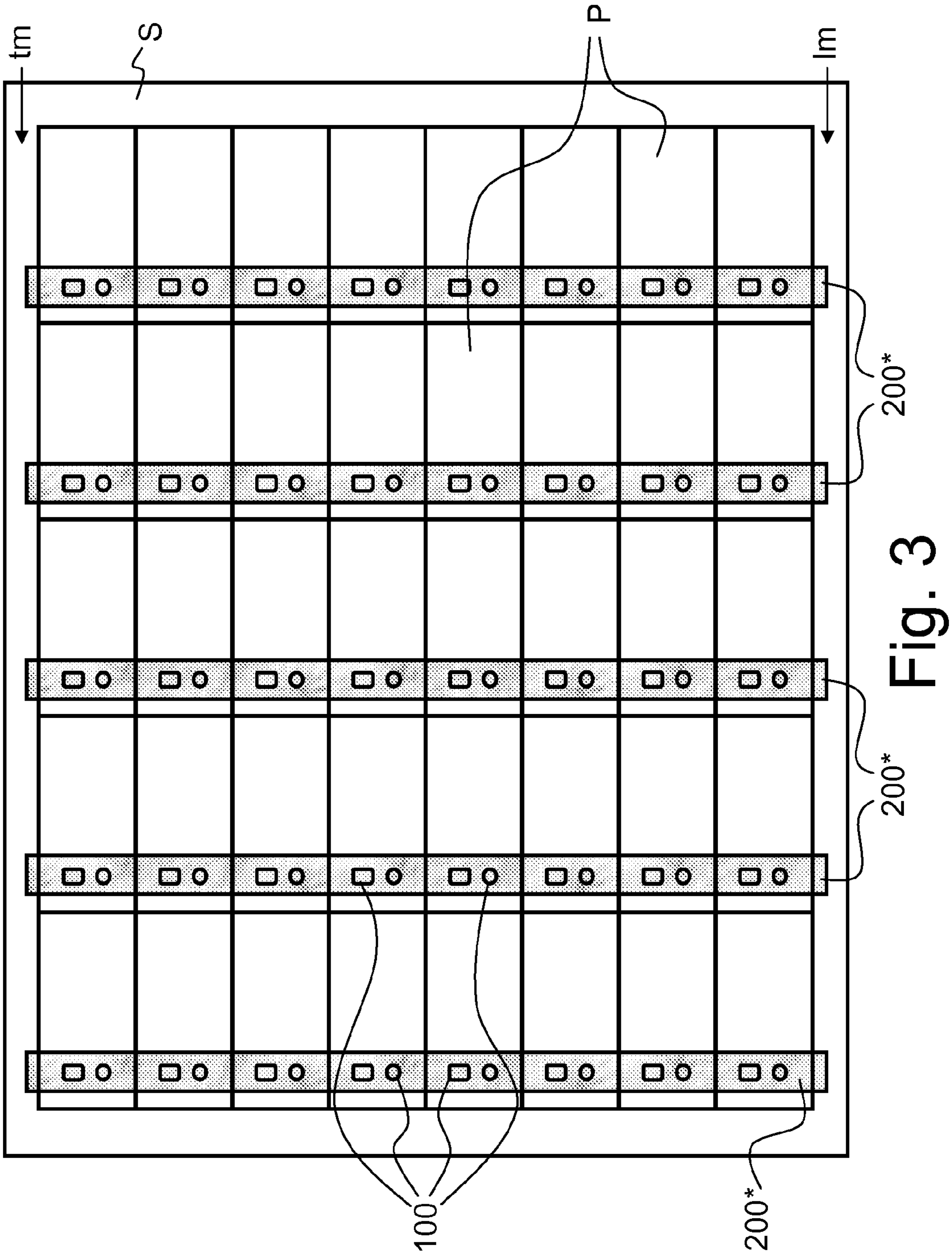
FIG. 3 is a schematic top view of a single sheet after cutting of the plurality of continuous bands of foil material of FIG. 2.

As a result of this cutting, the continuous flow of sheets S is again separated into individual sheets S with portions of foil material, designated by reference numeral 200* in FIG. 3, remaining on the sheets S. Such separation is necessary as the sheets S are to be transferred to a downstream-located chain conveyor system, designated generally by reference numeral 3 in FIG. 1.

As illustrated in FIG. 1, a suction drum 26 is located below the conveyor belts 24, downstream of the guide plate 25 and of the cutting unit 5. The circumferential surface of the suction drum 26 is tangent upon the plane in which the sheets S are conveyed in this region. The suction drum 26 preferably has a dedicated speed-controllable and/or position-controllable drive (not shown), comprising for instance an electric motor the speed of which can be adjusted. A circumferential speed of the suction drum 26 is controlled in such a manner that the suction drum 26 is initially at the conveying speed of the conveyor belts 24, is then accelerated to a speed which is slightly greater than the speed of the chain conveyor system 3, and is then decelerated again in order to permit transfer of the sheet S with which the suction drum 26 cooperates to a corresponding one of the gripper bars 30 of the chain conveyor system 3. This "overspeed" is required in order to cover a necessary travel of the sheet S between suction drum 26 and chain conveyor system 3.

Once transferred to the chain conveyor system 3, the processed sheets are then conveyed to a delivery pile unit of a sheet delivery station 4.

FIG. 2 is a schematic illustration of the flow of sheets S as it would be formed as a result of the application of the continuous bands of foil material 200 downstream of the application cylinder 21 in FIG. 1. In FIG. 2, reference numeral 100 designates windows that have been provided in the sheets S prior to the application of the continuous bands of foil material 200. Such windows 100 might be provided on-line in the same processing machine where the foil material 200 is applied (as for instance proposed in International application no. WO 2004/096541 A1) or in a separate machine.

In FIG. 2, which illustrates sheets S each carrying an array of imprints P arranged in eight rows and five columns (which matrix arrangement is purely illustrative), five continuous bands of foil material 200 are applied along a direction parallel to the sheet transport direction (indicated by the vertical arrows in FIG. 2), i.e. one continuous band 200 per column of imprints P. It shall be appreciated that more than one continuous band of foil material 200 could be applied per column of imprints P, for instance in case windows 100 are provided at more than one location along the length (i.e. transversely to the sheet transport direction) of each imprint P. In the illustrated example, each imprint P is provided with two windows 100 that are covered by the same band of foil material 200.

In FIG. 2, references lm and tm respectively designate a leading margin and trailing margin of the sheets S, i.e. portions of the sheets that do not carry any imprint P. While these margins will also be referred to as "unprinted margins", it shall be understood that such margins could nevertheless be provided with printed markings, for instance markings that are exploited in the context of logistic and/or quality management of the sheets.

In FIG. 2, the dashed lines designated by references C1 and C2 at the trailing and leading portions of the sheets, respectively, are indicative of the locations where cutting operations are to be carried out in the context of this first embodiment. In other words, according to this first embodiment, the continuous bands of foil material 200 are cut immediately after a leading edge of the sheets S (more precisely within the unprinted leading margin lm) and immediately before a trailing edge of the sheets S (more precisely within the unprinted trailing margin tm) over a whole width of the continuous bands 200. As a result, as illustrated by FIG. 3, continuous portions of foil material, which portions are designated by reference numerals 200*, are left remaining on each sheet S.

Figure 4:
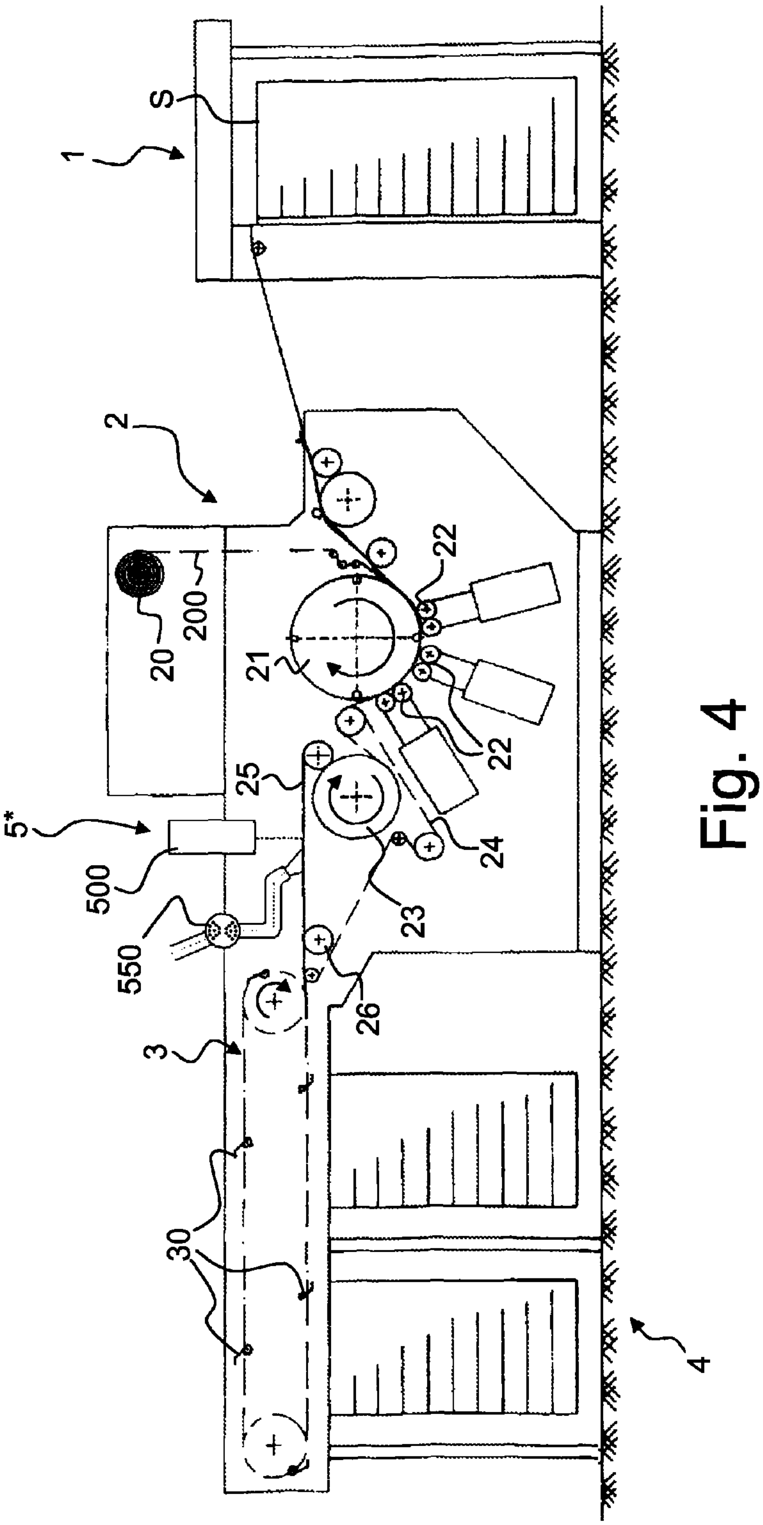
FIG. 4 is a schematic side view of a sheet-fed processing machine for applying foil material onto successive sheets according to one preferred embodiment of the invention.

FIG. 4 schematically illustrates an embodiment of an installation for carrying out the method of the invention, which embodiment differs from the one illustrated in FIG. 1 in that the mechanical cutting system 5, 50 is replaced by a laser cutting unit 5*. All other constituent parts of the installation are identical to those of the installation illustrated in FIG. 1 and are accordingly designated by the same reference numerals as in FIG. 1. As this will become apparent hereafter, the laser cutting unit 5* comprises in this embodiment a plurality of laser units 500 (namely three units) disposed above the horizontal guide plate 25, the laser beams generated by the laser units 500 being directed downwards towards the surface of the sheets S being transported thereunder. Downstream of the laser cutting unit 5* with respect to the direction of displacement of the sheets S, there is further provided a first aspiration unit, designated globally by reference numeral 550.

Figure 5:
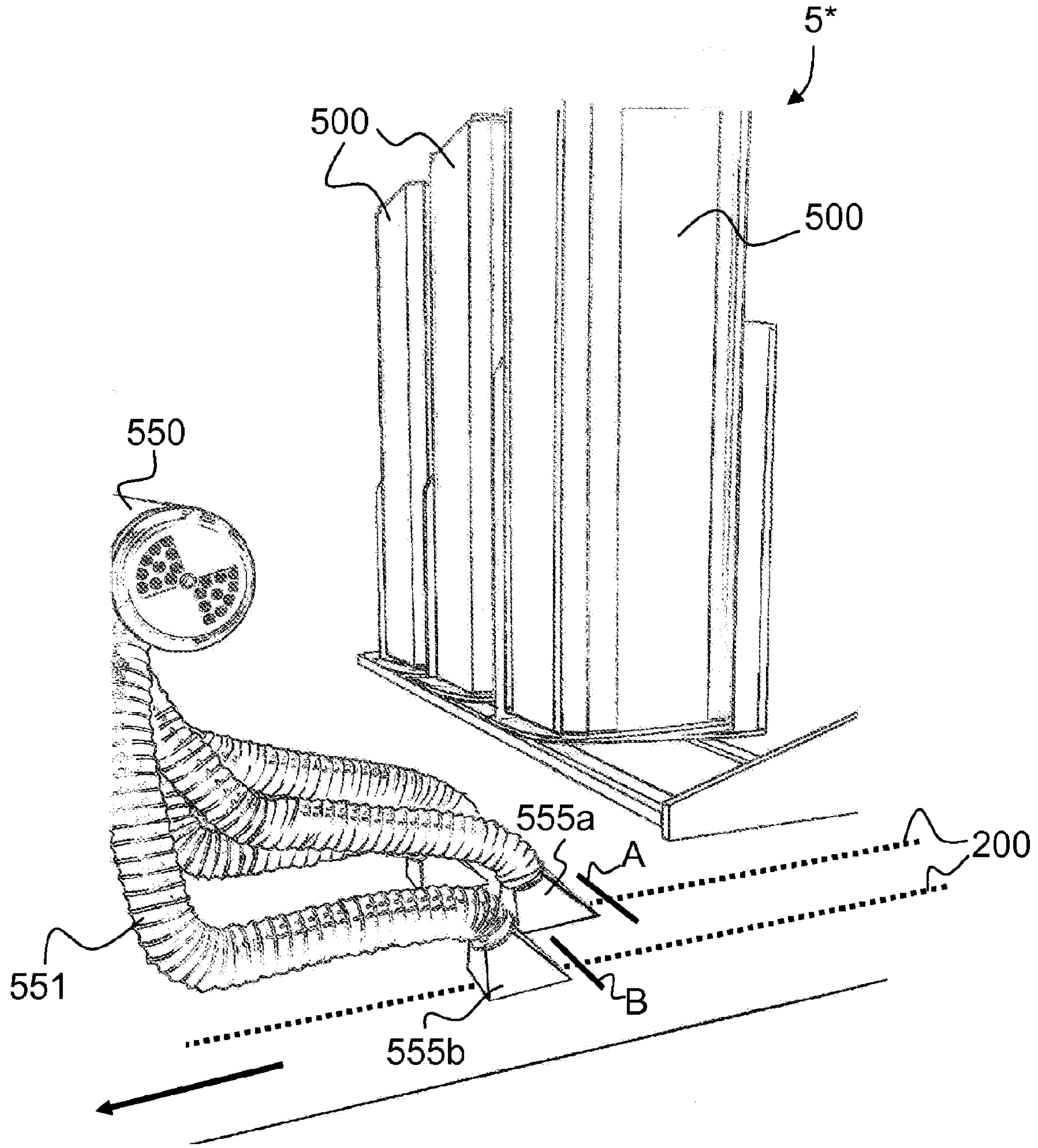
FIG. 5 is a partial perspective view of the laser cutting unit and aspiration unit used in the embodiment of FIG. 4.

FIG. 5 is a partial perspective view of the laser cutting unit 5*, 500 and aspiration unit 550 used in the embodiment of FIG. 4. As already mentioned, the laser cutting unit 5* comprises in this preferred example three laser units 500 mounted vertically above the path of the sheets. These laser units 500 may be any suitable laser units, such as $CO_2$-type laser units or Nd-YAG-type laser units, as commercially available from Macsa Laser Solutions (www.macsalaser.com) and KBA-Metronic (www.kba-metronic.com). A 60 W $CO_2$-type laser unit available from the above suppliers under the product designation "K-1060 Plus" was successfully used to carry out the cutting process.

In the preferred embodiment, and as schematically illustrated in FIG. 5, one laser unit 500 is used to perform cutting of two neighbouring continuous bands of foil material 200 applied on the sheets (two such bands of foil material 200 being schematically illustrated in FIG. 5 by dashed lines). Depending on the application, only one or more than two neighbouring bands of foil material 200 could be cut by one and the same laser unit 500. Each laser unit 500 may carry out a cutting operation over a distance, transversely to the direction of displacement of the sheets, of about 200 to 250 millimeters. In other words, the three laser units 500 may jointly cover a distance of 600 to 750 millimeters, which is sufficient to process most sheet formats used in the context of the production of security documents. More than three laser units may of course be used in case of necessity.

Figure 7:
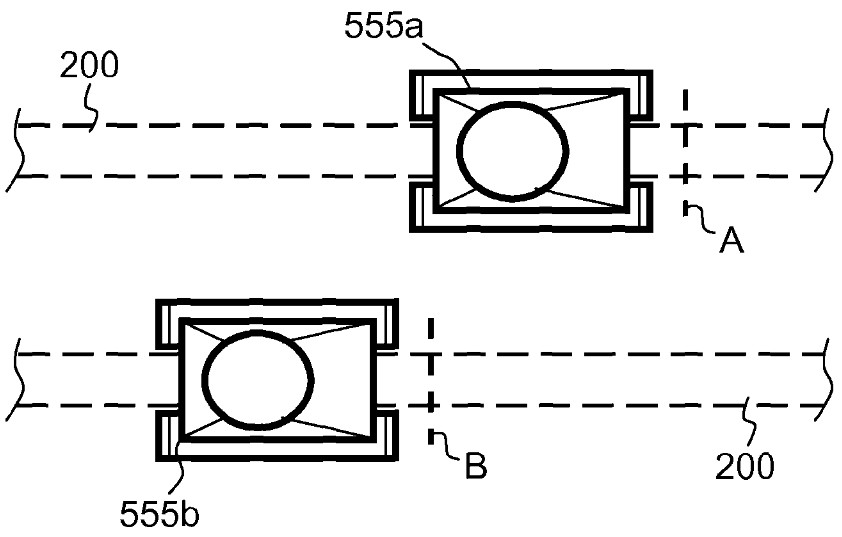
FIG. 7 is a schematic top view showing the respective locations of two neighbouring suction heads according to the embodiment of FIG. 4.

In the particular example of FIG. 5, and considering that the cutting operation is performed on sheets that are being transported (as schematically illustrated by the arrow in FIG. 5), the cutting operations of the two neighbouring bands of foil material 200 are preferably carried out by each laser unit in a staggered manner, transversely to the direction of displacement of the sheets. A first cutting operation is thus carried out at a first location (and at a first point in time) on a first of the two bands 200 as schematically illustrated by line A in FIG. 5, while a second cutting operation is carried at a second location (and at a second point in time) on the other one of the two bands 200 as schematically illustrated by line B in FIG. 5 (see also FIG. 7). The laser beam produced by each laser unit 500 is appropriately diverted to each cutting location A, B and with the appropriate timing to carry out the required cutting operations of the two bands at the appropriate locations with respect to the sheet being processed. It shall of course be understood that, while FIG. 5 (and FIG. 7) shows that the laser beam of each laser unit 500 is directed to two locations that are staggered with respect to one another, this is performed according to a timing such that the resulting locations where the bands 200 are actually cut with respect to the sheets S correspond to the desired locations where the bands have to be cut (e.g. cutting lines C1 and C2 in FIG. 2). The timing of the laser beam will basically dependent on the speed at which the sheets S are being transported.

FIG. 5 further illustrates a possible configuration of the first aspiration unit 550 according to the invention. In order to ensure proper evacuation of the portions of the bands of foil material 200 that are not to remain on the sheets (which portions correspond, in the example of FIG. 2, to the portions of the bands situated between cutting lines C1 and C2), the evacuation is carried by direct aspiration of the waste portions at least at a first position located downstream of and proximate to the cutting positions A, B where the continuous bands of foil material 200 are cut by laser.

It shall be appreciated that such direct aspiration of the waste portions contrasts with the solution discussed in European patent application No. 07103051.4 and International application No. PCT/IB2008/050626 in the context of a mechanical cutting system wherein the waste portions are first transported by a cylinder in front of an aspiration unit before being actually evacuated by aspiration (hence such former solution does not provide for a direct aspiration of the waste portions from a position situated downstream of and proximate to the location where the cutting operation is carried out as defined in the annexed claims).

To this end, the first aspiration unit 550 comprises a plurality of suction heads (two of them being designated by reference numerals 555*a* and 555*b* in FIG. 5) disposed adjacent to the surface of the sheets S being transported for carrying out aspiration of the said waste portions of the bands of foil material 200 at the positions located downstream of and proximate to the cutting positions A, B mentioned above. In the example of FIG. 5, the suction heads 555*a*, 555*b* are accordingly disposed in a staggered manner transversely to the direction of displacement of the sheets S. Such staggered arrangement is more clearly illustrated in the schematic top view of FIG. 7. Each suction head 555*a*, 555*b* is conveniently coupled to the aspiration unit 550 by a corresponding flexible hose 551 as illustrated in FIG. 5.

One may provide as many suction heads as there are bands of foil material 200 applied onto the sheets S, i.e. one suction head for each continuous band of foil material 200 applied onto the sheets S (e.g. five suction heads would be required in the example illustrated in FIGS. 2 and 3). Alternatively, one suction head may be used to cooperate with more than one band of foil material 200.

The suction heads 555*a*, 555*b* may advantageously be mounted onto supporting rails (not illustrated), especially in such a way that a position of each suction head 555*a*, 555*b* can be adjusted along and/or transversely to the direction of displacement of the sheets S.

Figure 6A:
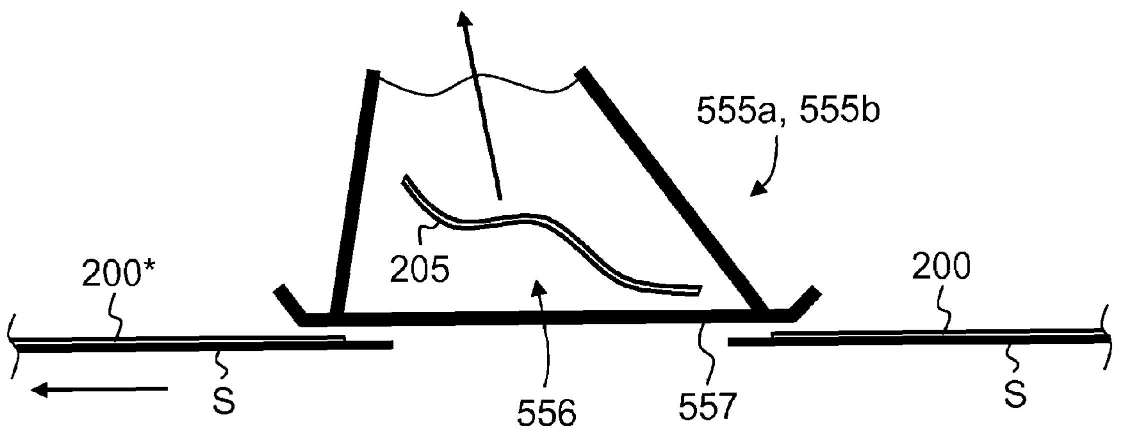
FIGS. 6*a* and 6*b* are schematic side and bottom views, respectively, of a suction head arrangement of the aspiration unit of FIG. 5.
Figure 6B:
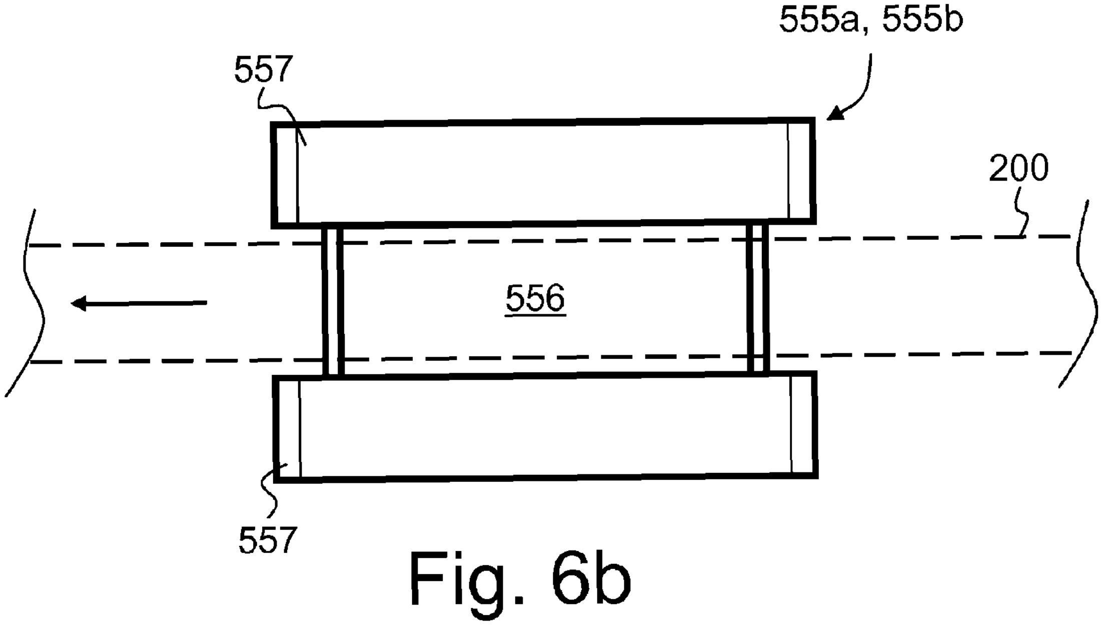

FIGS. 6*a* and 6*b* are schematic side and bottom views, respectively, of a preferred suction head arrangement. As shown in these Figures, each suction head 555*a*, 555*b* preferably comprises a suction aperture 556 for aspirating the waste portions (designated by reference numeral 205 in FIG. 6*a*) of foil material 200 that are to be evacuated and at least one non-aspirating supporting portion 557 designed to bear against the surface of the sheets S at a location not covered by the bands of foil material 200. As illustrated in the bottom view of FIG. 6*b*, two such supporting portions 557 mounted on the distal end of the suction head 555*a*, 555*b* are provided on each side of the location where the band of foil material 200 is led.

The purpose of the supporting portion(s) 557 is to provide a support against which the surface of the sheets S can bear so as to prevent the sheets S from being aspirated into the suction aperture 556 and maximise the evacuation efficiency. Since the supporting portion(s) 557 may come into contact with the surface of the sheets S, it is convenient to use a low-friction material to realize the said portion(s) 557 so as to prevent defects from occurring on the sheets S as a result of friction or abrasion.

Figure 8:
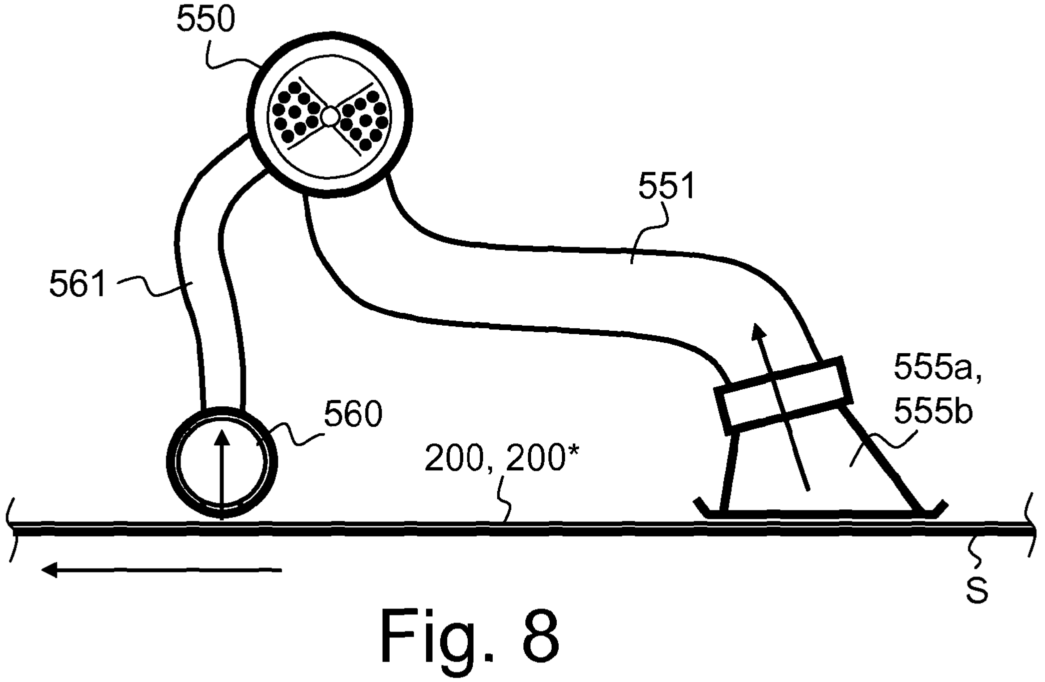
FIG. 8 is a schematic side view of another embodiment of an aspiration system that can be used in the context of the invention.

FIG. 8 is a schematic side view of another embodiment of an aspiration system that can be used in the context of the invention. This aspiration system comprises the first aspiration unit 550 with its plurality of suction heads 555*a*, 555*b* connected thereto by connection hoses 551, which first aspiration unit 550 is located at a first, upstream, location with respect to the direction of displacement of the sheets S, as well as a second aspiration unit 560 disposed at a second position located downstream of the first position of the first aspiration unit (in FIG. 8, it shall be understood that the sheets S move from right to left). This second aspiration unit 560 is used to evacuate waste portions 205 of the bands of foil material 200 that might not have been evacuated by the first aspiration unit. This second aspiration unit 560 may advantageously be designed in the manner of a simple aspiration tube disposed above and transversely to the direction of displacement of the sheets S with suction apertures located at the underside thereof. As illustrated, the second aspiration unit 560 may be operatively-coupled to the first aspiration unit 550, for instance through a connecting hose 561.

Figure 9:
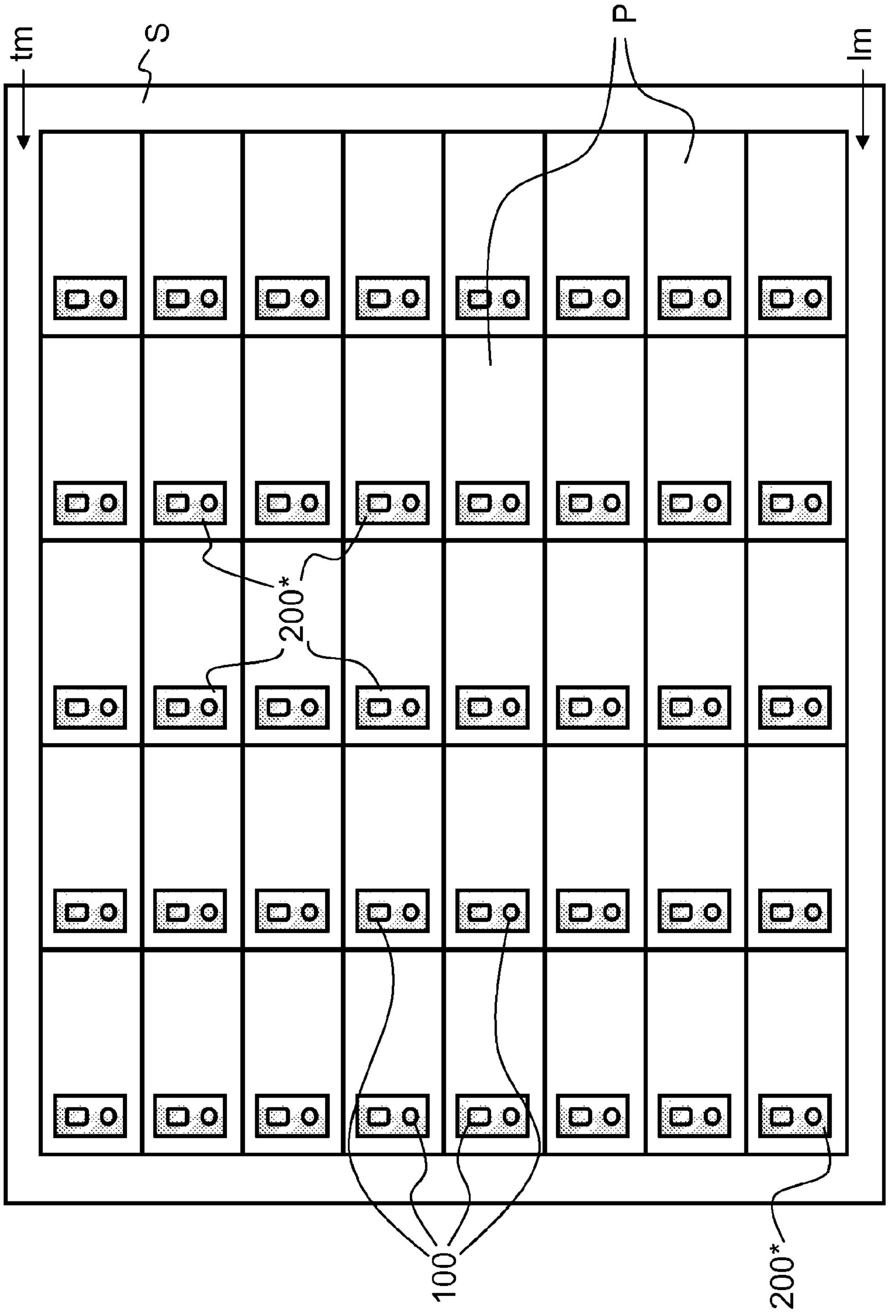
FIG. 9 is a schematic top view of a single sheet after cutting of the plurality of continuous bands of foil material of FIG. 2 according to a variant of the invention.

According to an alternate embodiment of the invention, one could cut the continuous bands of foil material 200 at a plurality of locations along the length of the foil material, such that a plurality of distinct portions of foil material 200* are left remaining in each column of imprints P on the sheets, as for instance illustrated in FIG. 9. This is useful in case one wishes to avoid that the foil material 200* extends over the whole height of each imprint P, and be limited to only a small region surrounding the windows 100. One will appreciate that this would require a greater number of cutting operations per sheet. This could easily be performed by appropriately operating the laser-cutting unit a plurality of times per sheet.

In such case, the operative parameters of the laser cutting unit should be selected in such a way as to cut exclusively the foil material 200 and not to mark the underlying surface of the sheets S.

Figure 10:
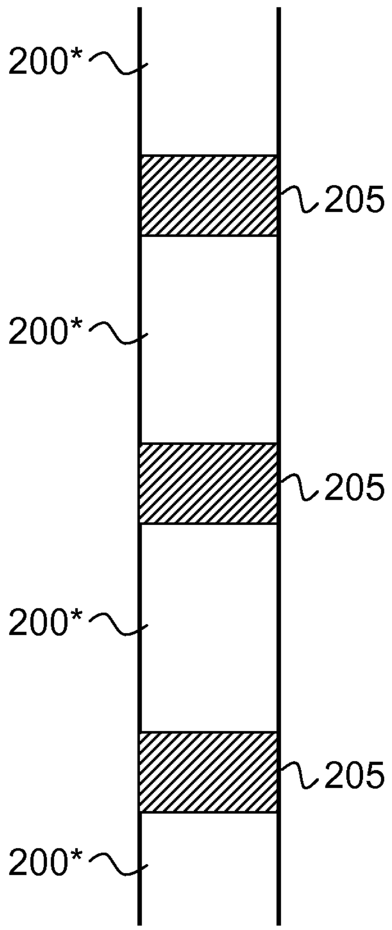
FIG. 10 is a partial top view of a band of foil material illustrating a possible cutting alternative of the band of foil material.

In order to produce the result of FIG. 9, the cutting operations could be carried out over the whole width of the continuous band of foil material 200 as illustrated in FIG. 10, thereby creating an alternate succession of portions 200* that are to remain on the sheets S and waste portions 205 that are to be evacuated.

In the context of the present invention, cutting is preferably carried out at locations where the adhesive layer has not been activated, preferably in an immediate vicinity of the portions of foil material that are to remain on the sheets. While peripheral portions of the foil material are not adhering to the sheets after the application process in such a case, the dimensions thereof can be minimized. Furthermore, it is common practice to subject the sheets after application of foil material to an intaglio printing process, especially in order to overprint the foil material. As a result of intaglio printing, the peripheral portions of the foil material are made to adhere to the sheets due to the combined effect of temperature and pressure inherent to intaglio printing.

Various modifications and/or improvements may be made to the above-described embodiments without departing from the scope of the invention as defined by the annexed claims.

It shall in particular be appreciated that, while the invention is preferably applied with a view to cover windows cut into the sheets, the invention is equally applicable to any other situation where one wishes to apply foil material onto the sheets by lamination, rather than by hot-foil stamping techniques. In particular, the invention could also be applied in the context of the reinforcement of regions of reduced thickness, such as discussed in WO 2004/024464 A1.

In addition, a device (not illustrated) might be provided for checking that the waste portions 205 of foil material 200 have properly been evacuated. This could be performed using a simple light-emitting device directed towards the surface of the sheets S at the location where the foil material 200 is applied and a photoreceptor for checking a reflection point of the light beam produced by the light-emitting device. The device could alternatively comprise a camera for taking a whole picture of a portion of the location of the sheets S where the foil material 200 is applied and an image processing system for detecting presence or absence of the foil material 200.

Another refinement may consist in providing means for checking passage of a leading and/or trailing edge of the sheets S and adjusting operation of the laser cutting unit 5*, 500 as a function of the passage of the said edge. Such means may include a device for generating a light beam perpendicularly to the plane where the sheets S are transported and detection means for monitoring a reflection point of the light beam generated by the said device on the surface of the sheets S. Alternatively, a photoreceptor might be provided on the other side of the sheets in order to detect interruption of the light beam caused by passage of the sheets S. Detection of the passage of the leading and/or trailing edge of the sheets S can be used to correct the timing of the laser cutting unit and ensure that the laser beams are generated at the appropriate times. Detection of the passage of both the trailing edge of a preceding sheet and the leading edge of a subsequent sheet may provide an indication of the actual distance between two successive sheets S.

Lastly, it might be advantageous to provide an inspection system downstream of the cutting unit for inspecting the quality of the sheets and detecting defects on the sheets, such as improperly cut foil material and/or waste portions of foil material sticking to the sheets, as the case may be.

The invention claimed is:

1. An installation for applying foil material onto successive sheets, comprising:

a sheet-by-sheet feeding station for feeding individual sheets in succession along a sheet transport path, which individual sheets are not linked to one another;

a foil application unit for applying at least one continuous band of foil material onto the individual sheets along a direction substantially parallel to a direction of displacement of the individual sheets, thereby forming a continuous flow of sheets linked to one another by the at least one continuous band of foil material;

a laser cutting unit, located downstream of the foil application unit, for cutting the at least one continuous band of foil material by means of a laser beam such that the continuous flow of sheets is separated into the individual sheets which are not linked to one another with portions of foil material remaining on the sheets, the laser cutting unit performing the cutting at positions located on the sheets such that the portions of foil material remaining on the sheets do not extend beyond leading and trailing edges of the sheets; and a sheet delivery station for receiving the individual sheets, the installation further comprising at least a first suction unit including a suction head disposed adjacent to the surface of the sheets for carrying out aspiration of waste portions of the at least one continuous band of foil material at a first position located downstream of and proximate to a cutting position where the at least one continuous band of foil material is cut by the laser beam.

2. The installation according to claim 1, wherein the suction head comprises a suction aperture for aspirating the waste portions of the at least one continuous band of foil material and at least one non-aspirating supporting portion bearing against the sheets at a location not covered by the at least one continuous band of foil material.

3. The installation according to claim 1, wherein a position of the suction head is adjustable along and/or transversely to a direction of displacement of the sheets.

4. The installation according to claim 1, wherein the sheets are sheets carrying an array of imprints arranged in a matrix of rows and columns, and wherein at least one continuous band of foil material is applied along each column of imprints and wherein a suction head is provided for each continuous band of foil material applied onto the sheets.

5. The installation according to claim 1, further comprising a second aspiration unit disposed at a second position located downstream of the first position to evacuate waste portions of the at least one continuous band of foil material that might not have been evacuated by the first aspiration unit.

6. The installation according to claim 5, wherein the first and second aspiration units are operatively-coupled to one another.

7. The installation according to claim 1, wherein the sheets are sheets of securities.

* * * * *